United States Patent [19]

Schiefer et al.

[11] Patent Number: 4,765,243
[45] Date of Patent: Aug. 23, 1988

[54] METHOD OF PRINTING ON PLASTIC SUBSTRATE USING A WATER-BASED INK

[75] Inventors: Harry M. Schiefer, Midland, Mich.; Keith S. McClarnon, Lake Zurich, Ill.

[73] Assignee: Dow Corning Corporation, Midland, Mich.

[21] Appl. No.: 57,598

[22] Filed: Jun. 2, 1987

[51] Int. Cl.$^4$ ........................ B41M 1/00; C09D 11/00
[52] U.S. Cl. ..................................... 101/451; 106/20; 106/21; 106/22
[58] Field of Search ................................... 106/20–22; 556/445; 101/451, 463.1, 426

[56] References Cited

U.S. PATENT DOCUMENTS 3,299,112  1/1967  Bailey ............................. 260/448.2
4,137,083  1/1979  Hedrick ............................. 106/20

Primary Examiner—Theodore Morris
Attorney, Agent, or Firm—Alexander Weitz

[57] ABSTRACT

A method of flexographic or rotogravure printing onto a plastic substrate using a water-based ink is disclosed wherein the improvement comprises adding to said ink from about 0.005 to about 5 weight percent of a low molecular weight silicone compound. The incorporation of the silicone compound provides good wetting of the substrate by the ink and results in improved printing characteristics.

13 Claims, No Drawings

METHOD OF PRINTING ON PLASTIC SUBSTRATE USING A WATER-BASED INK

BACKGROUND OF THE INVENTION

Flexographic and rotogravure printing processes have been widely practiced in the past using solvent-based inks. More recently, environmental, fire hazard, toxicological and petrochemical supply concerns have provided a growing impetus for the development of water-based inks to be used in these printing processes. Although these efforts have resulted in many commercially successful inks for corrugated and paper applications, development of suitable water-based inks for printing on plastic substrates has met with somewhat less progress. This is understandable when one considers that the surface energy of typical plastic substrates such as polyethylene and polypropylene are much lower than water, resulting in poor wetting of these materials by water-based inks. This problem has been partly overcome in the art by inclusion in the ink composition of at least one organic co-solvent which reduces the ink's surface tension. Thus, for example, low slip polyethylene for sanitary overwrap applications has been successfully printed upon using commercial water-based inks.

However, there still remains room for improvement in coating other low surface energy plastics such as high slip polyethylene, which contains fatty amide slip additives. This latter substrate is quite difficult to print upon using conventional water-based inks, the major problems being pinhole formation and lack of adhesion of the ink to the substrate. Furthermore, unlimited addition of co-solvents can not be considered a panacea in this case, or, for that matter, in general, since there are at present a number of Environmental Protection Agency (EPA) regulations and guidelines stemming from the Clean Air Act which limit the volatile organic compound (VOC) content of the ink compositions. For example, a so-called "compliance water-based ink" contains a volatile portion which consists of at most 25 volume percent of VOC. Therefore, there is a need in the art for flexographic and rotogravure water-based ink compositions which utilize minimum amounts of organic co-solvents while still providing good wetting and printing characteristics on low surface energy plastic substrates.

SUMMARY OF THE INVENTION

It has now been found that, when certain low molecular weight silicone compounds are added to flexographic or rotogravure water-based ink compositions, they impart good wetting characteristics to the inks on plastic substrates. This, in turn, results in improved printing on the plastic substrates, particularly when said sustrate is a low surface energy material, such as the above mentioned high slip polyethylene.

The present invention therefore relates to a method of flexographic or rotogravure printing onto a plastic substrate using a water-based ink, the improvement comprising adding to said ink from about 0.005 to about 5 weight percent of a silicone compound selected from copolymers represented by the average formula
$(Me_3SiO)_3SiQ$
$(Me_3SiO(Me_2SiO))_3SiQ$
$Me_3SiO(MeQSiO)_iSiMe_3$,
$Me_3SiO(Me_2SiO)_j(MeQSiO)_kSiMe_3$,
$ZMe_2SiO(Me_2SiO)_wSiMe_2Q$ or
$ZMe_2SiO(Me_2SiO)_x(MeQSiO)_ySiMe_2Q$
wherein Me denotes the methyl radical, Z is Me or Q, Q is selected from $-R(CH_2CH_2O)_nR'$ or $-RO(CH_2CH_2O)_nR'$, in which R is an alkylene group having from 2 to 6 carbon atoms, R' is selected from hydrogen, an alkyl group having 1 to 4 carbon atoms or an acyl group having 2 to 7 carbon atoms and n is 3 to 15, and wherein i is 1 to 5, j is 1 to 4, k is 1 to 3, w is 1 to 4, x is 1 to 3 and y is 1 to 3.

This invention further relates to the above described composition.

DETAILED DESCRIPTION OF THE INVENTION

This invention relates to the addition of a silicone compound to a water-based flexographic or rotogravure ink in order to improve the wetting and printing characteristics of the ink when printing onto plastic substrates. The silicone compound of the present invention is selected from low molecular weight copolymers having the following average structures.
$(Me_3SiO)_3SiQ$
$(Me_3SiO(Me_2SiO))_3SiQ$
$Me_3SiO(MeQSiO)_iSiMe_3$,
$Me_3SiO(Me_2SiO)_j(MeQSiO)_kSiMe_3$,
$ZMe_2SiO(Me_2SiO)_wSiMe_2Q$ or
$ZMe_2SiO(Me_2SiO)_x(MeQSiO)_ySiMe_2Q$
wherein Me denotes the methyl radical. In these formulae Z is either Me or Q and Q is selected from $-R(CH_2CH_2O)_nR'$ or $-RO(CH_2CH_2O)_nR'$, in which R is an alkylene group having from 2 to 6 carbon atoms, R' is selected from hydrogen, an alkyl group having 1 to 4 carbon atoms or an acyl group having 2 to 7 carbon atoms and n is 3 to 15. In order to be within the scope of the present invention, i is 1 to 5, j is 1 to 4, k is 1 to 3, w is 1 to 4, x is 1 to 3 and y is 1 to 3.

It is preferred that Z=Q. With regard to Q, it is preferred that R is the group $-CH_2CH_2CH_2O-$ and R' is hydrogen. However, when R' is alkyl, it is preferred that this be the methyl radical, and when R' is acyl that this be the acetyl group. Highly preferred silicone compounds of this invention are $Me_3SiO(MeQSiO)SiMe_3$ and $Me_3SiO(Me_2SiO)(MeQSiO)SiMe_3$, wherein Q is $-CH_2CH_2CH_2O(CH_2CH_2O)_nH$ and n is 7 to 12.

The silicone compounds employed in the present invention are well known in the art and many of them are available commercially. They may be prepared by reacting the corresponding methylhydrogensiloxane with a polyoxyethylene compound having a terminal $-CH_2=CH_2$ group and using a platinum addition catalyst to promote the reaction. Thus, for example, the preparation of one of the preferred embodiments may be represented as follows:

$Me_3SiO(MeHSiO)SiMe_3 +$

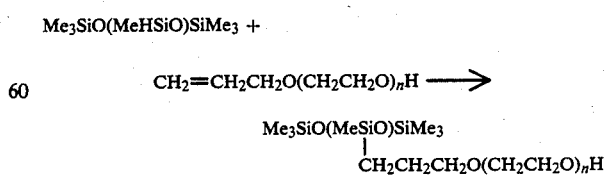

In this hydrosilation reaction the platinum catalyst is typically provided in the form of chloroplatinic acid diluted in isopropyl alcohol and the reaction is generally carried out neat at about 100° to 150° C. When the methyhydrogensiloxane is formed by an equilibration reaction, as in the preparation of a copolymer such as Me$_3$SiO(Me$_2$SiO)$_j$(MeHSiO)$_k$SiMe$_3$, cyclic siloxane species generated during the equilibration are an undesirable component and are preferably stripped out of these precursors before reacting with the polyoxyethylene compound having a terminal —CH$_2$=CH$_2$ group. Likewise, if the molecular weight of the precursor methylhydrogensiloxane permits distillation, this purified product is preferred for reaction with the polyoxyethylene compound.

In order to form the compositions of the present invention, from 0.005 to 5 weight percent of the silicone compound is added to a water-based flexographic or rotogravure ink which has been formulated for printing on plastic substrates. The addition can be accomplished by any conventional method providing a homogeneous dispersion in the ink is obtained. If desired, and as is common in the art, the viscosity of the ink may be adjusted by adding small quantity of a water/solvent mixture, such as a 80/20 blend of water/isopropyl alcohol, till the viscosity is reduced to a value of about 20–30 seconds in a #2 Zahn Cup. At this point the silicone compound may be added neat or, preferably, as a pre-diluted solution in isopropyl alcohol. The exact amount of silicone compound needed to obtain good wetting properties is greatly dependent upon the particular ink system and plastic substrate employed, the optimum content being readily determined by routine experimentation. Preferably, from about 0.1 to 1.0 percent by weight of the silicone compound is added to the ink composition.

For the purposes of the present invention, the water-based flexographic and rotogravure inks used to print on plastic substrates generally comprise a pigment, at least one binder for the pigment, an alkaline compound which renders the binder water dispersible, at least one solvent and water. These ink compositions are well known in the art and are commercially available in the form of numerous proprietary formulations. The interested reader is directed, for example, to the review article by Argent entitled "Water-Base Laminating Inks - a Technical Review" which was published in *The Journal of the Technical Association of the Pulp and Paper Industry*, Vol. 68, No. 9 (1985), the contents of which are hereby incorporated by reference.

Examples of pigments useful in these water-based inks include inorganic pigments such as titanium dioxide white, aluminum silicate clay, and organic pigments such as diarylide yellow, naphthol red, phthalocyanine blue, phthalocyanine green and carbon black. These are generally added to the ink composition so as to provide from about 20 to 30 percent of the dry ink volume. In the course of developing the instant invention, it has been observed that water-based inks containing red, blue and black pigments are the most troublesome in coating plastic film and these colors would therefore benefit most from the method of the present invention.

Suitable binders include alkali soluble resins such as shellac, rosin maleate, carboxylated acrylic and styrene-maleic anhydride. Emulsion binders such as styrenated shellac, acrylic and styrenated acrylic polymers may also be employed.

The alkaline compound may be an amine, such as ammonia and diethylamine, and is included to react with the carboxyl groups on the binder to form water-dispersible salts therefrom. Alternatively, an alkali such as sodium hydroxide may be used for this purpose.

Solvents, such as alcohols, glycol ethers and glycols are used in combination with the water to solubilize the binders in the ink. They help to reduce the surface tension of the ink composition, thereby allowing better wetting of plastic surfaces. However, their content is limited by environmental regulations and guidelines in many applications, and they often can not be added in sufficient quantity to obtain desired results when printing on plastic substrates. Moreover, even when these solvents are employed without such limitation, proper wetting of certain substrates such as high slip polyethylene, as defined infra, or polypropylene is difficult without addition of the silicone compounds of the present invention.

In the method of the present invention the ink composition containing the silicone compound is employed in a flexographic or rotogravure process for printing on plastic substrates. These processes are well known in the art and need not be described herein. The interested reader is referred to review articles in the *Kirk-Othmer Encyclopedia of Chemical Technology* (J. Wiley, 1978) under the headings of "Printing Processes" and "Inks" for extensive descriptions. Since flexographic processes utilize a rubber-coated printing roll, it is contemplated that this process would benefit more from the method of the present invention because organic solvents incorporated in the ink compositions can attack the rubber which may lead to printing distortions and reduced longevity of the rolls.

Plastic substrates which benefit from the incorporation of the silicone compound in the inks used for printing thereon according to the method of this invention include polyethylene, polypropylene and polyethyleneteraphthalate. Polyethylene and other polyolefins may first be chemically (e.g., etched) or electrically (e.g., corona discharge) treated to further improve ink wet-out and adhesion. The method of this invention is particularly suited for use with so-called high slip polyethylene films since these contain processing aids (slip additives) such as fatty amides which bloom to the surface of the films and are not easily wetted by the water-based ink compositions.

The method of the present invention may be employed in flexographic or rotogravure printing of plastic films, sheets and laminates. A particularly suitable application of this method includes printing on packaging. In this application, polyethylene, treated or untreated, polypropylene and polyethyleneteraphthalate are utilized extensively.

EXAMPLES

The following examples are presented to further illustrate the present invention but are not to be construed as limiting the invention, which is delineated in the appended claims. All parts and percentages in the examples are on a weight basis unless indicated to the contrary.

EXAMPLE 1

A silicone copolymer (FLUID A) having the average structure Me$_3$SiO(Me$_2$SiO)(MeQSiO)SiMe$_3$, wherein Me denotes the methyl radical and Q is the group —CH$_2$CH$_2$CH$_2$O(CH$_2$CH$_2$O)$_{12}$H, was prepared. This copolymer was formed according to a method well known in the art by reacting the corresponding methylhydrogensiloxane with an allyloxypolyoxyethylene having 12 ethylene oxide (EO) units in the presence of chloroplatinic acid catalyst.

EXAMPLE 2

A silicone copolymer (FLUID B) having the average structure $Me_3SiO(MeQSiO)SiMe_3$, wherein Me denotes the methyl radical and Q is the group $-CH_2CH_2CH_2O(CH_2CH_2O)_7H$, was prepared by a method similar to that of Example 1, above.

(COMPARATIVE) EXAMPLES 3-4

Two flexographic inks, AQUAZELL WRG Cyan Red and AQUAZELL WRG Cyan Blue, were obtained from CZ Inks (Shrewsbury, MO). These are described as "compliance water-reducible film printing inks,"0 wherein the term "compliance" indicates that these formulations adhere to EPA regulations regarding volatile organic compound (VOC) content. The viscosity of each ink was adjusted by adding a small amount of a 80/20 water/isopropanol blend until the Zahn Cup viscosity measured about 30 seconds in a #2 cup. A high slip polyethylene film having a thickness of about 1 mil was coated with these viscosity-adjusted inks using a wire-wound drawdown rod to provide a wet film thickness of about 0.27 mil. Quality of the ink coating was determined by estimating the percentage of the coated area not wetted by the ink composition, this percentage being greater when the wetting is poorer. The results of this evaluation are presented in Table 1, below.

EXAMPLES 5-9

Diluted Cyan Red and Cyan Blue inks, prepared according to (Comparative) Examples 3 and 4 were modified by adding from 0.1 to 0.3% of FLUID A and 0.1% of FLUID B, as indicated in Table 1, below. In each case, the silicone fluid was first diluted to about 10% in isopropanol in order to facilitate the preparation. The proportions of FLUID A and FLUID B indicated in Table 1 are based on silicone solids in the corresponding viscosity-adjusted ink. Drawdowns on the high slip polyethylene film, as described above, resulted in improved coatings as indicated by the lower percentages of non-wetted area reported in Table 1.

TABLE 1

| Example | Amount of Additive | Ink Type | Percentage of Non-Wetted Area |
|---|---|---|---|
| 3 (Control) | None | Cyan Red | 10% |
| 4 (Control) | None | Cyan Blue | 30 |
| 5 | 0.1% FLUID A | Cyan Red | 5 |
| 6 | 0.1% FLUID B | Cyan Red | 8 |
| 7 | 0.2% FLUID A | Cyan Red | 0.5 |
| 8 | 0.2% FLUID A | Cyan Blue | 30 |
| 9 | 0.3% FLUID A | Cyan Blue | 1 |

In general, the inks containing the silicone copolymer additives (i.e., FLUIDS A and B) produced good films whereas the control without additive showed poor wetting of the high slip polyethylene.

We claim:

1. In a method of flexographic or rotogravure printing onto a plastic substrate using a water-based ink, the improvement comprising adding to said ink from about 0.005 to about 5 weight percent of a silicone compound selected from those represented by the average formulas $(Me_3SiO)_3SiQ$,
$(Me_3SiO(Me_2SiO))_3SiQ$,
$Me_3SiO(MeQSiO)_iSiMe_3$,
$Me_3SiO(Me_2SiO)_j(MeQSiO)_kSiMe_3$,
$ZMe_2SiO(Me_2SiO)_wSiMe_2Q$ or
$ZMe_2SiO(Me_2SiO)_x(MeQSiO)_ySiMe_2Q$ wherein Me denotes the methyl radical, Z is Me or Q, Q is selected from $-R(CH_2CH_2O)_nR'$ or $-RO(CH_2CH_2O)_nR'$, in which R is an alkylene group having from 2 to 6 carbon atoms, R' is selected from hydrogen, an alkyl group having 1 to 4 carbon atoms or an acyl group having 2 to 7 carbon atoms and n is 3 to 15, and wherein i is 1 to 5, j is 1 to 4, k is 1 to 3, w is 1 to 4, x is 1 to 3 and y is 1 to 3.

2. The process according to claim 1, wherein Z is the group Q.

3. The process according to claim 2, wherein R' is selected from hydrogen, the methyl radical or the acetyl group.

4. The process according to claim 3, wherein R' is hydrogen.

5. The process according to claim 4, wherein said silicone compound is selected from
$Me_3SiO(MeQSiO)_iSiMe_3$ or
$Me_3SiO(Me_2SiO)_j(MeQSiO)_kSiMe_3$.

6. The process according to claim 5, wherein i=1, j=1 and k=1.

7. The process according to claim 6, wherein n is 7 to 12.

8. The process according to claim 7, wherein Q is the group $-CH_2CH_2CH_2O(CH_2CH_2O)_nH$.

9. The process according to claim 8, wherein from 0.1 to 1.0 weight percent of said silicone compound is added to said ink.

10. The process according to claim 1, wherein said substrate is high slip polyethylene.

11. The process according to claim 5, wherein said substrate is high slip polyethylene.

12. The process according to claim 8, wherein said substrate is high slip polyethylene.

13. The process according to claim 9, wherein said substrate is high slip polyethylene.

* * * * *